US010635380B2

(12) United States Patent
Kajita et al.

(10) Patent No.: US 10,635,380 B2
(45) Date of Patent: Apr. 28, 2020

(54) SYSTEM, HEAD-MOUNTED DISPLAY, AND CONTROL METHOD THEREOF

(75) Inventors: Yoshiki Kajita, Kawasaki (JP); Takuya Tsujimoto, Kawasaki (JP); Kazuhide Miyata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 728 days.

(21) Appl. No.: 12/181,887

(22) Filed: Jul. 29, 2008

(65) Prior Publication Data

US 2009/0033588 A1 Feb. 5, 2009

(30) Foreign Application Priority Data

Aug. 2, 2007 (JP) .................. 2007-202230

(51) Int. Cl.
| | | |
|---|---|---|
| G06F 3/147 | (2006.01) | |
| G02B 27/01 | (2006.01) | |
| H04N 1/00 | (2006.01) | |
| H04N 5/262 | (2006.01) | |
| G02B 27/00 | (2006.01) | |
| G06T 19/00 | (2011.01) | |
| H04W 84/12 | (2009.01) | |
| H04W 8/24 | (2009.01) | |

(52) U.S. Cl.
CPC ......... *G06F 3/147* (2013.01); *G02B 27/0093* (2013.01); *G02B 27/017* (2013.01); *G02B 27/0172* (2013.01); *G06T 19/006* (2013.01); *H04N 1/00127* (2013.01); *H04N 5/2628* (2013.01); *G02B 2027/014* (2013.01); *G02B 2027/0138* (2013.01); *H04N 2201/3253* (2013.01); *H04W 8/24* (2013.01); *H04W 84/12* (2013.01)

(58) Field of Classification Search
CPC ...................................................... G06F 3/012
USPC ...................... 345/2.3, 8; 340/901; 359/630
See application file for complete search history.

(56) References Cited

U.S. PATENT DOCUMENTS

| | | | | | |
|---|---|---|---|---|---|
| 5,662,523 | A | * | 9/1997 | Yasumaru et al. | 463/30 |
| 5,844,530 | A | * | 12/1998 | Tosaki | 345/8 |
| 6,061,064 | A | * | 5/2000 | Reichlen | 345/418 |
| 6,630,915 | B1 | * | 10/2003 | Flood | 345/8 |
| 6,972,734 | B1 | * | 12/2005 | Ohshima et al. | 345/8 |
| 7,920,165 | B2 | * | 4/2011 | Adderton | 348/143 |
| 2002/0149545 | A1 | * | 10/2002 | Hanayama et al. | 345/7 |
| 2006/0250322 | A1 | * | 11/2006 | Hall et al. | 345/8 |

(Continued)

FOREIGN PATENT DOCUMENTS

| | | |
|---|---|---|
| JP | 06-069862 | 3/1994 |
| JP | 06-086353 | 3/1994 |
| JP | 2004-015518 | 1/2004 |

*Primary Examiner* — Jeff Piziali
(74) *Attorney, Agent, or Firm* — Cowan, Liebowitz & Latman, P.C.

(57) ABSTRACT

An HMD (10*a*) generates region information indicating a region having, as an axis, a line which passes through the position of the HMD (10*a*) and that of a wireless I/F (105*a*). The HMD acquires position information of each of wireless I/Fs of other image processing apparatuses (11*b*, 11*c*). The HMD determines if the position indicated by the acquired position information is included in the region indicated by the region information. The HMD selects one of the wireless I/F (105*a*) and other wireless I/Fs as a wireless communication partner according to the determination result, and receives images via wireless communication with the selected wireless I/F.

7 Claims, 11 Drawing Sheets

(56) References Cited

U.S. PATENT DOCUMENTS

2007/0069977 A1* 3/2007 Adderton ................. 345/8
2008/0030304 A1* 2/2008 Doan et al. ............. 340/10.1
2008/0106488 A1* 5/2008 Okuno ..................... 345/8
2010/0026787 A1* 2/2010 Yasuda et al. ............ 348/47

* cited by examiner

SYSTEM, HEAD-MOUNTED DISPLAY, AND CONTROL METHOD THEREOF

BACKGROUND OF THE INVENTION

Field of the Invention

The present invention relates to a technique for providing mixed reality.

Description of the Related Art

In recent years, as a technique for seamlessly merging a physical world and virtual world in realtime, a mixed reality (so-called MR) technique is known. As one MR technique, the following technique is known. That is, using a video see-through HMD, an object that approximately matches an object observed from the pupil position of a user who wears the HMD is captured by a video camera or the like. An image generated by superimposing a computer graphics (to be abbreviated as CG hereinafter) image on that captured image is presented to the user who wears the HMD.

FIG. 11 is a block diagram showing the functional arrangement of a general mixed reality system (to be referred to as an MR system hereinafter) using a video see-through HMD. An overview of the general MR system will be described below with reference to FIG. 11.

Reference numeral 1101 denotes a video see-through HMD. The HMD 1101 comprises an image capturing unit 1103, display unit 1104, three-dimensional (3D) position and orientation sensor 1105, and I/F (interface) 1106.

Reference numeral 1102 denotes an image processing apparatus which generates a virtual space image (CG) based on 3D position and orientation information generated from captured image information and sensor information received from the HMD 1101, and executes composition processing with a captured image received from the HMD 1101. The image processing apparatus 1102 generally comprises an apparatus such as a PC (personal computer), workstation, or the like, which has an advanced arithmetic processing function and graphics display function. The image processing apparatus 1102 comprises an I/F 1107, position and orientation information generation unit 1108, CG rendering and compositing unit 1110, and contents DB (database) 1109.

The operations of the respective units of the HMD 1101 will be described first.

The image capturing unit 1103 captures an image of an external world at a position and orientation that approximately match the viewpoint of a user who wears the HMD 1101 on the head. The image capturing unit 1103 comprises image capturing elements for the right and left eyes, an optical system, and a DSP (digital signal processor) for image processing of the subsequent stage.

The display unit 1104 is used to display MR images for the right and left eyes output from the image processing apparatus 1102. Therefore, the display unit 1104 comprises display devices for the right and left eyes, and an optical system. As each display device, a compact liquid crystal display or retina-scanning type device based on MEMS (Micro Electro-Mechanical Systems) is used.

The 3D position and orientation sensor 1105 is used to measure its position and orientation. As the 3D position and orientation sensor 1105, a magnetic sensor or gyro sensor (acceleration, angular velocity) is used.

The I/F 1106 is used to make data communications with the image processing apparatus 1102. Images captured by the image capturing unit 1103 and position and orientation information measured by the 3D position and orientation sensor 1105 are transmitted to the image processing apparatus 1102 via this I/F 1106. MR images transmitted from the image processing apparatus 1102 are received via this I/F 1106. As the I/F 1106, a metal line of USB or IEEE1394 or an optical fiber of GigabitEthernet or the like, which can meet realtimeness and can transfer large-capacity data, is used.

The operations of the respective units of the image processing apparatus 1102 will be described below.

The I/F 1107 is used to make data communications with the HMD 1101, and MR images generated by the image processing apparatus 1102 are transmitted to the HMD 1101 via this I/F 1107. Captured images and position and orientation information transmitted from the HMD 1101 are received via this I/F 1107.

The position and orientation information generation unit 1108 generates position and orientation information indicating the position and orientation of the eyes of the user who wears the HMD 1101 based on the captured image information and position and orientation information transmitted from the HMD 1101. As another method of generating the position and orientation information indicating the position and orientation of the eyes of the user, for example, a method using images captured by the image capturing unit 1103 is available.

The contents DB 1109 saves data associated with virtual objects that configure a virtual space.

The CG rendering and compositing unit 1110 builds a virtual space using the data saved in the contents DB 1109, and generates, as virtual space images, images which are obtained by viewing the built virtual space from the viewpoint having the position and orientation indicated by the position and orientation information generated by the position and orientation information generation unit 1108. Then, the unit 1110 generates MR images by compositing the generated virtual space images on the captured images received from the HMD 1101 via the I/F 1107. The generated MR images are transmitted to the HMD 1101 via the I/F 1107.

By the processing based on the aforementioned arrangement, an MR world that seamlessly merges the physical and virtual worlds in real time can be provided to the user who wears the HMD 1101 on the head.

A general system which makes wireless communications between the image processing apparatus and HMD (wireless MR system) will be described below. The wireless MR system can also be implemented by adopting wireless communications between the I/Fs 1106 and 1107 without changing the arrangements of other functional blocks in the arrangement shown in FIG. 11. However, a wireless communication method normally suffers a problem of a considerably narrow transmission bandwidth compared to a wired communication method. Therefore, in order to implement the wireless MR system, for example, an arrangement shown in FIG. 9 is preferably adopted.

FIG. 9 is a block diagram showing the functional arrangement of a general wireless MR system. The same reference numerals in FIG. 9 denote the same parts as in FIG. 11, and a description thereof will not be repeated. An overview of the general wireless MR system will be described below with reference to FIG. 9.

An I/F 1206 is used to transmit position and orientation information calculated by the position and orientation information generation unit 1108 to an image processing apparatus 1202 via a wireless communication.

An I/F 1207 is used to receive the position and orientation information transmitted from an HMD 1201 via a wireless communication, and to output the received information to a CG rendering unit 1210.

The CG rendering unit 1210 builds a virtual space using the data saved in the contents DB 1109, and generates, as virtual space images, images which are obtained by viewing the built virtual space from the viewpoint having the position and orientation indicated by the position and orientation information received by the I/F 1207. The unit 1210 transmits the generated virtual space images to the HMD 1201 via the I/F 1207.

That is, the HMD 1201 does not transmit any captured images to the image processing apparatus 1202 but it transmits only position and orientation information. The image processing apparatus 1202 transmits the virtual space images generated based on that position and orientation information to the HMD 1201. In this way, the data transmission volume exchanged between the HMD 1201 and image processing apparatus 1202 can be reduced.

Upon reception of the virtual space images transmitted from the image processing apparatus 1202, the I/F 1206 outputs these images to an image compositing unit 1211.

The image compositing unit 1211 generates composite images by superimposing the virtual space images received from the I/F 1206 on captured images from the image capturing unit 1103, and outputs them to the display unit 1104.

In the MR system using the video see-through HMD, it is important to assure the visual field of the user who wears the HMD. Particularly, in the wireless MR system that adopts the wireless communication method in transmission of images, the frequency of occurrence of errors increases depending on environments of use and distances between the apparatuses. In addition, switching of image processing apparatuses as communication partners frequently occurs upon movement of the user who wears the HMD, and CG images ceases to be received when another user who is experiencing the MR space intercepts the view with the image processing apparatus as a communication partner.

As a processing method when the communication state becomes unstable due to another user and the apparatuses, patent reference 1 discloses a method of switching a wireless base station as a communication partner based on the radio field strength. According to patent reference 1, when a mobile station detects interference information at a predetermined radio field strength or more, it sends a communication channel switching request to the wireless base station as a communication partner, and the wireless base station sends a new communication channel instruction to the mobile station. When the wireless base station as a communication partner cannot assure a new communication channel, an adjacent wireless base station assures a new communication channel via an exchange. As a channel used to send the switching request and new communication channel instruction, an information channel of a frequency different from that of the communication channel is used.

Patent reference 2 discloses a method of executing channel connection, switching control, and the like by detecting the moving direction and moving velocity of a mobile station.

According to patent reference 2, the moving direction of a mobile station is detected, and when the moving direction is headed toward a position outside a mobile communication service area, a base station notifies the mobile station of the absence of a communication area in the moving direction before the mobile station moves to a position outside the mobile communication service area.

According to patent reference 3, a Doppler shift detection circuit equipped in a radio device of each wireless base station equipment detects the center frequency drift of a channel used by a mobile station, and also detects the traveling direction and velocity of the mobile station, thus automatically executing channel connection and disconnection control.

[Patent Reference 1] Japanese Patent Laid-Open No. 6-69862

[Patent Reference 2] Japanese Patent Laid-Open No. 6-86353

[Patent Reference 3] Japanese Patent Laid-Open No. 2004-15518

However, the aforementioned related arts suffer the following problems.

The technique disclosed in patent reference 1, that is, the method of executing switching control by detecting interference information based on the radio field strength measurement requires the mobile station to always measure the radio field strength. Hence, the consumption power of the mobile station side is large, thus shortening the continuous battery-driven time. Furthermore, since control is done after detection of interference, the mobile station suffers the influence of the interference until switching is completed. Furthermore, when a plurality of users shares the wireless MR system, different images need to be transmitted to the respective users, and a plurality of wireless devices are used within a limited space. Therefore, the frequency bands used by respective HMDs need to be assigned without causing any interference. Therefore, the technique disclosed in patent reference 1 premised on detection of interference information cannot be applied to the wireless MR system.

The techniques disclosed in patent references 2 and 3, that is, the methods of notifying outside the communication range and switching of a base station based on the moving direction of a mobile station do not consider movements of other users and apparatuses. For this reason, these methods cannot detect occurrence of interception of communications due to interception of the view to the base station as a communication partner.

SUMMARY OF THE INVENTION

The present invention has been made in consideration of the aforementioned problems, and has as its object to provide a technique required to smoothly attain wireless image transmission to HMDs when a plurality of users who wear the HMDs on the heads share an MR space.

According to the first aspect of the present invention, a system which comprises a plurality of head-mounted displays, a plurality of communication devices which make wireless communications with the head-mounted displays, and a plurality of image processing apparatuses which transmit images to the head-mounted displays via the communication devices, and allows the image processing apparatuses to communicate with each other, each image processing apparatus comprises:

a unit which transmits position information of the head-mounted display as a current wireless communication partner of the communication device which is in use by the self image processing apparatus to another image processing apparatus other than the self image processing apparatus, and receives position information, which is transmitted from the other image processing apparatus, of another head-mounted display as a current wireless communication partner of the communication device which is in use by the other image processing apparatus; and a transmission unit which transmits the received position information of the other head-mounted display to the head-mounted display as the current wireless communication partner of the communication device which is in use by the self image processing apparatus, and each head-mounted display comprises:

a generation unit which generates region information indicating a region having, as an axis, a line which passes through a position of the self head-mounted display and a position of a communication device of interest as a current wireless communication partner of the self head-mounted display;

an acquisition unit which acquires position information transmitted from the transmission unit;

a determination unit which determines whether or not a position indicated by the position information acquired by the acquisition unit is included in the region indicated by the region information generated by the generation unit; and a reception control unit which selects one of the communication device of interest and the communication device other than the communication device of interest as a wireless communication partner according to a determination result of the determination unit, and receives images via a wireless communication with the selected communication device.

According to the second aspect of the present invention, a head-mounted display in a system which comprises a plurality of head-mounted displays, a plurality of communication devices which make wireless communications with the head-mounted displays, and a plurality of image processing apparatuses which transmit images to the head-mounted displays via the communication devices, and allows the image processing apparatuses to communicate with each other, the head-mounted display comprises:

a generation unit which generates region information indicating a region having, as an axis, a line which passes through a position of the self head-mounted display and a position of a communication device of interest as a current wireless communication partner of the self head-mounted display;

an acquisition unit which acquires position information of another head-mounted display other than the self head-mounted display;

a determination unit which determines whether or not a position indicated by the position information acquired by the acquisition unit is included in the region indicated by the region information generated by the generation unit; and a reception control unit which selects one of the communication device of interest and the communication device other than the communication device of interest as a wireless communication partner according to a determination result of the determination unit, and receives images via a wireless communication with the selected communication device.

According to the third aspect of the present invention, a method of controlling a head-mounted display in a system which comprises a plurality of head-mounted displays, a plurality of communication devices which make wireless communications with the head-mounted displays, and a plurality of image processing apparatuses which transmit images to the head-mounted displays via the communication devices, and allows the image processing apparatuses to communicate with each other, the method comprises:

a generation step of generating region information indicating a region having, as an axis, a line which passes through a position of the self head-mounted display and a position of a communication device of interest as a current wireless communication partner of the self head-mounted display;

an acquisition step of acquiring position information of another head-mounted display other than the self head-mounted display;

a determination step of determining whether or not a position indicated by the position information acquired in the acquisition step is included in the region indicated by the region information generated in the generation step; and a reception control step of selecting one of the communication device of interest and the communication device other than the communication device of interest as a wireless communication partner according to a determination result of the determination step, and receiving images via a wireless communication with the selected communication device.

Further features of the present invention will become apparent from the following description of exemplary embodiments with reference to the attached drawings.

DESCRIPTION OF THE EMBODIMENTS

Preferred embodiments of the present invention will be described in detail hereinafter with reference to the accompanying drawings. Note that these embodiments will be explained as examples of the preferred arrangements of the invention described in the scope of claims, and the invention is not limited to the embodiments to be described hereinafter.

[First Embodiment]

This embodiment will explain a technique for smoothly making wireless communications in a system which attains communications between an HMD to be mounted on the head of a user, and an image processing apparatus for transmitting images to this HMD by wireless communications.

A system for providing an MR space defined by merging virtual and physical spaces to a single user will be explained first.

Figure 2:
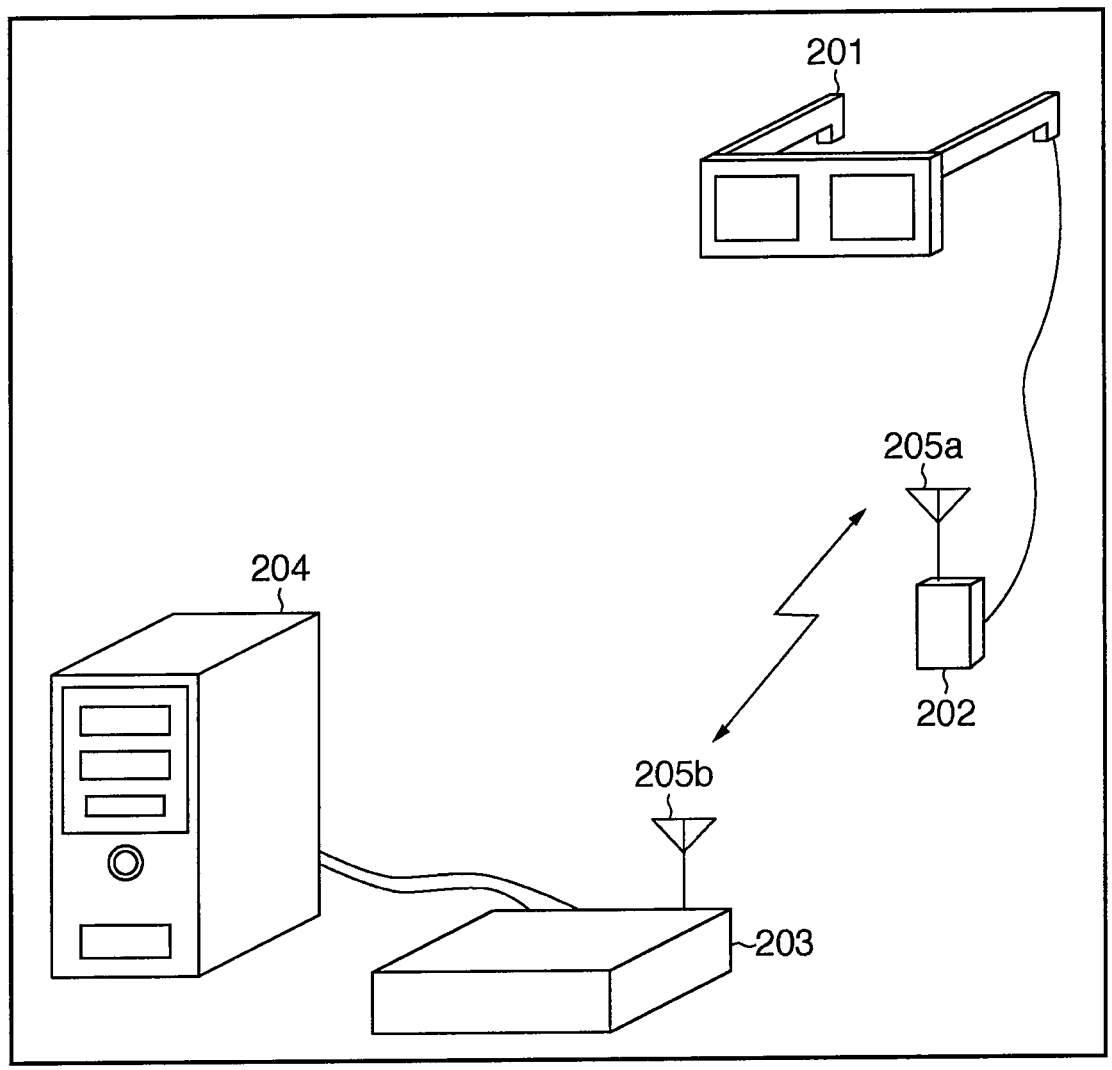
FIG. 2 is a view showing an example of the outer appearance of a system which provides an MR space obtained by merging virtual and physical spaces to a single user.

FIG. 2 is a view showing an example of the outer appearance of a system which provides an MR space defined by merging virtual and physical spaces to a single user.

An HMD 201 is a video see-through HMD, and comprises an image capturing unit used to capture physical space images to be presented to the right and left eyes of the user who wears the HMD 201 on the head, a display unit used to display the images for the right and left eyes, and a measurement unit used to measure its position and orientation. Furthermore, to the HMD 201, a relay 202 is connected via a cable, and a transmission/reception antenna 205a is provided to the relay 202. In this arrangement, the HMD 201 makes a wireless communication with an image processing apparatus 204 via the relay 202 and transmission/reception antenna 205a. A wireless communication method used in this system assumes a method of configuring a small-scale network such as a WLAN (Wireless Local Area Network), WPAN (Wireless Personal Area Network), or the like. The relay 202 can be mounted on a part of the user body when it is used like the HMD 201, and the HMD 201 and relay 202 can be battery-driven.

The HMD 201 transmits position and orientation information generated based on the measurement result of the measurement unit and captured images captured by the image capturing unit to the image processing apparatus 204 via the relay 202 and transmission/reception antenna 205a.

On the other hand, the image processing apparatus 204 comprises a computer such as a general PC (personal computer) or the like. To the image processing apparatus 204, a controller 203 is connected via a cable, and a transmission/reception antenna 205b is provided to the controller 203. In this arrangement, the image processing apparatus 204 makes a wireless communication with the HMD 201 via the controller 203 and transmission/reception antenna 205b.

Upon reception of the position and orientation information transmitted from the HMD 201 via the transmission/reception antenna 205b and controller 203, the image processing apparatus 204 generates virtual space images based on the received position and orientation information. The apparatus 204 transmits various kinds of information to be described later together with the generated virtual space images to the HMD 201 via the controller 203 and transmission/reception antenna 205b. Since "various kinds of information" will be described in detail later, a description about transmission of such information will not be given here.

Upon reception of the virtual space images via the transmission/reception antenna 205a and relay 202, the HMD 201 generates composite images by compositing the received virtual space images on physical space images captured by the image capturing unit. The HMD 201 then displays the generated composite images on the display unit.

Note that FIG. 2 illustrates the relay 202 and transmission/reception antenna 205a as independent devices arranged outside the HMD 201. However, the following description will be given under the assumption that the relay 202 and transmission/reception antenna 205a are included in the HMD 201 as one functional unit called a wireless I/F (communication device), for the sake of simplicity. However, even when the relay 202 and transmission/reception antenna 205a are arranged outside the HMD 201, as shown in FIG. 2, the essence of the following description remains the same.

Likewise, FIG. 2 illustrates the controller 203 and transmission/reception antenna 205b as independent devices arranged outside the image processing apparatus 204. However, the following description will be given under the assumption that the controller 203 and transmission/reception antenna 205b are included in the image processing apparatus 204 as one functional unit called a wireless I/F, for the sake of simplicity. However, even when the controller 203 and transmission/reception antenna 205b are arranged outside the image processing apparatus 204, as shown in FIG. 2, the essence of the following description remains the same.

Figure 1:
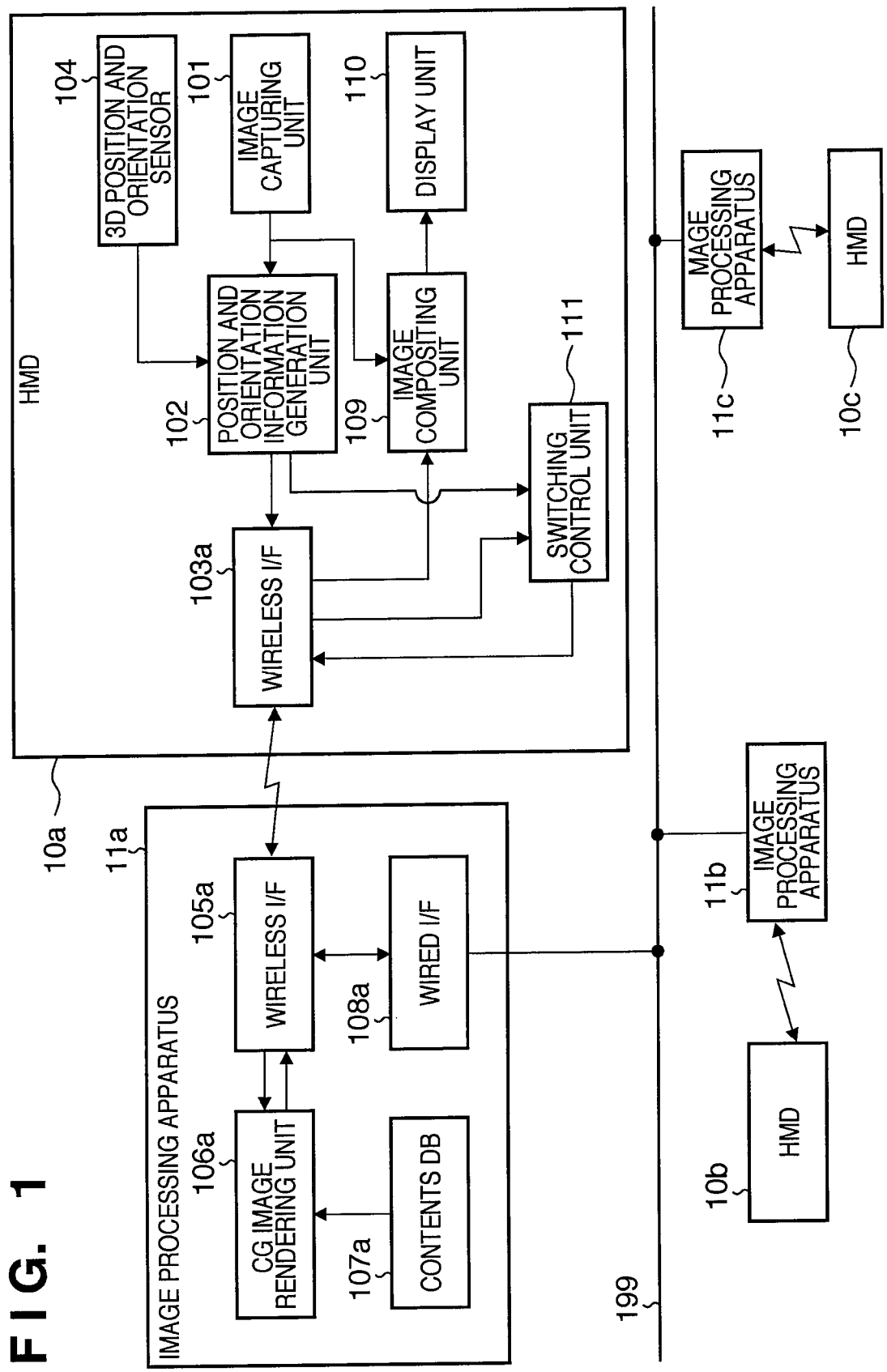
FIG. 1 is a block diagram showing an example of the functional arrangement of an MR system which can provide an MR space to a plurality of users.

FIG. 1 is a block diagram showing an example of the functional arrangement of an MR system which can provide an MR space to a plurality of users. That is, the system shown in FIG. 1 includes systems shown in FIG. 2 as many as the number of users, and has an arrangement in which respective image processing apparatuses are connected via cables.

The system according to this embodiment will be described below.

An HMD 10a is a video see-through HMD as an example of a head-mounted display, and is mounted on a user who observes an MR space, as is well known. The HMD 10a comprises a 3D position and orientation sensor 104, image capturing unit 101, display unit 110, position and orientation information generation unit 102, image compositing unit 109, wireless I/F 103a, and switching control unit 111.

The 3D position and orientation sensor 104 measures its position and orientation, and outputs position and orientation information as the measurement result to the position and orientation information generation unit 102 of the subsequent stage. As the 3D position and orientation sensor 104, various sensors may be used and, for example, a magnetic sensor may be used. When the 3D position and orientation sensor 104 is a magnetic sensor, a transmitter as a source of magnetism is arranged at a predetermined position on the physical space. The transmitter generates a magnetic field around itself. The 3D position and orientation sensor 104 detects a change in magnetic field according to its position and orientation in the magnetic field, and outputs a signal indicating the detection result to a controller used to control the transmitter. This controller measures the position and orientation of the 3D position and orientation sensor 104 on a sensor coordinate system based on that signal. Note that the sensor coordinate system is a coordinate system which is defined to have the position of the transmitter as an origin, and has three axes which are orthogonal to each other at that origin as x-, y-, and z-axes. In this embodiment, the following description will be given under the assumption that the origin and axes of the sensor coordinate system match those of a world coordinate system, for the sake of simplicity. However, even if they do not match, if the position and orientation relationship between these coordinate systems is given, a coordinate value on the sensor coordinate system can be converted into that on the world coordinate system using a known coordinate conversion technique. The world coordinate system is a coordinate system which is defined to have a predetermined point on the physical space as an origin, and has three axes which are orthogonal to each other at that origin as x-, y-, and z-axes.

Note that other sensors may be applied to the 3D position and orientation sensor 104. For example, an ultrasonic sensor, optical sensor, and the like may be applied.

The position and orientation information generation unit 102 calculates position and orientation information of the image capturing unit 101 using the position and orientation information received from the 3D position and orientation sensor 104 and physical space images received from the image capturing unit 101.

However, various methods of calculating the position and orientation information of the image capturing unit 101 are available, and this embodiment may use any of these methods.

Some examples of the method of calculating the position and orientation information of the image capturing unit 101 will be described below.

For example, the position and orientation information of the image capturing unit 101 may be calculated by adding "information indicating the position and orientation relationship between the 3D position and orientation sensor 104 and image capturing unit 101", which is measured in advance, to the position and orientation information received from the 3D position and orientation sensor 104.

A method of calculating the position and orientation information of the image capturing unit 101 using captured images by the image capturing unit 101 will be described below. Prior to a description, since this method is a state-of-the-art technique, a detailed description thereof will not be given. When the position and orientation information of the image capturing unit 101 is calculated using captured images by the image capturing unit 101, the 3D position and orientation sensor 104 can be omitted.

Figure 3:
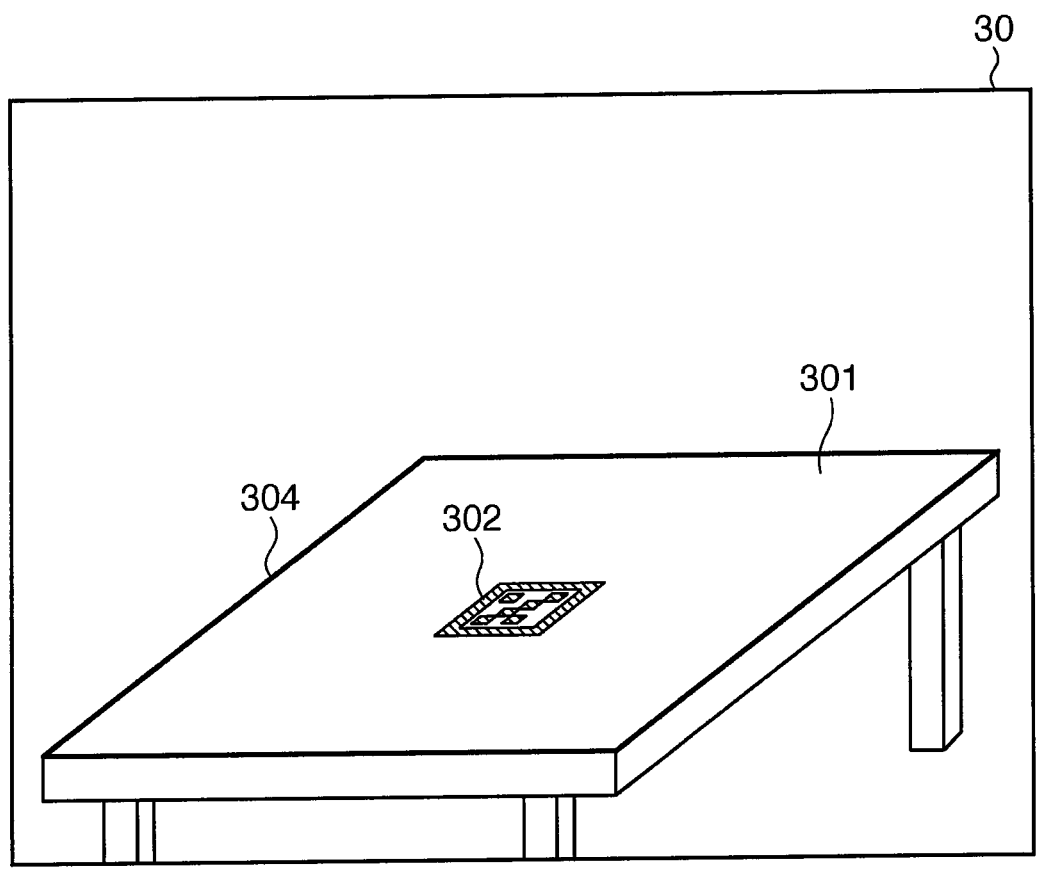
FIG. 3 is a view showing an example of a captured image obtained when an image capturing unit 101 captures an image of a physical space on which a marker is laid out.

FIG. 3 shows an example of a captured image obtained when the image capturing unit 101 captures an image of a physical space on which a marker is laid out. Referring to FIG. 3, reference numeral 302 denotes a marker, which describes a two-dimensional (2D) barcode obtained by converting various kinds of information into codes, and around which a frame is described. This marker 302 is laid out on a table 301 as a physical object in FIG. 3, and assume that the position (3D coordinate position) or a relative position from a certain reference position of the marker 302 on the world coordinate system is given. Reference numeral 30 denotes a physical space image obtained by capturing an image of such physical space by the image capturing unit 101.

When the image capturing unit 101 captures the physical space image 30, and outputs the captured physical space image 30 to the position and orientation information generation unit 102, the position and orientation information generation unit 102 detects the marker 302 in the physical space image 30 first. The position and orientation information generation unit 102 then analyzes the 2D barcode described in the detected marker 302 to recognize identification information of that 2D barcode. Since the 3D coordinate position of the marker corresponding to the identification information is stored in advance, the position and orientation information generation unit 102 specifies the corresponding 3D coordinate position from an information group which is stored in advance, when the identification information is recognized by the aforementioned processing. Then, the position and orientation information generation unit 102 can generate the position and orientation information of the image capturing unit 101 using the coordinate position of the marker 302 on the physical space image 30 and the corresponding 3D coordinate position, and also a state-of-the-art technique such as photogrammetry or the like. Note that a plurality of markers 302 may be used. In place of the marker 302, edges 304 in the image may be used. A marker that can be used as the marker 302 is not limited to that described with a 2D barcode. For example, a marker which has no directionality such as a color marker, a light-emitting element (e.g., LED), or the like may be used.

In this way, various markers can be used in place of the marker 302. Also, these enumerated markers may be appropriately combined. Since the processing executed by the position and orientation information generation unit 102 is a state-of-the-art technique, no more explanation will be given. In addition, a method of calculating the position and orientation information of the image capturing unit 101 using a device of a type, which is attached to a member other than the HMD when it is used, such as an objective camera (external image sensor) or the like is also available. In this case, a marker needs to be adhered to the image capturing unit 101. Such method is also a state-of-the-art technique.

Note that only one type of these sensing devices may be used, or a plurality of types of devices may be combined and used. By generating 3D position and orientation information by combining image information captured by a subjective camera incorporated in the HMD and sensing information acquired by a sensing device, 3D position and orientation information with higher precision can be obtained. Also, position and orientation information can be acquired even in a state in which the subjective camera cannot see any marker.

As described above, various methods of generating the position and orientation information of the image capturing unit 101 are available, and this embodiment is not limited to any of these methods. Therefore, the arrangement of the HMD 10a is modified as needed according to the method to be used. However, such modification can be easily conceived by those who are skilled in the art, and a description thereof will not be given.

On the other hand, the position and orientation information generation unit 102 transmits the calculated "position and orientation information of the image capturing unit 101" to the image processing apparatus 204 via the wireless I/F 103a. This transmission is attained by a wireless communication, as described above.

The image capturing unit 101 captures a moving image of the physical space, and outputs the captured images of respective frames (physical space images, captured images) to the position and orientation information generation unit 102 and image compositing unit 109 of the subsequent stage.

The image compositing unit 109 generates composite images of virtual space images received from an image processing apparatus 11a via the wireless I/F 103a and physical space images received from the image capturing unit 101, and outputs the generated composite images to the display unit 110.

The display unit 110 is attached to the HMD 10a so as to be located in front of the eyes of the user who wears the HMD 10a on the head, and displays the composite images received from the image compositing unit 109. In this way, the composite images generated by the image compositing unit 109 are displayed in front of the eyes of the user who wears the HMD 10a on the head.

Upon reception of position and orientation information and connection information (to be described later) transmitted from the image processing apparatus 11a via the wireless I/F 103a, the switching control unit 111 executes processing for selecting and determining a wireless communication partner from image processing apparatuses 11a to 11c using these pieces of information. Details of the operation of the switching control unit 111 will be described later.

The image processing apparatus 11a will be described below. The image processing apparatus 11a is implemented by a computer such as a PC or the like, and comprises a wireless I/F 105a, wired I/F 108a, CG image rendering unit 106a, and contents DB 107a.

The wireless I/F 105a receives the position and orientation information transmitted from the wireless I/F 103a of the HMD 10a, and outputs the received position and orientation information to the wired I/F 108a and CG image rendering unit 106a.

The wired I/F 108a transmits the position and orientation information received from the wireless I/F 105a to other image processing apparatuses 11b and 11c connected to a network 199 such as a LAN or the like. Furthermore, the wired I/F 108a transmits connection information indicating whether or not the image processing apparatus 11a is currently making a wireless communication (for example, a set of an ID unique to the image processing apparatus 11a and flag information indicating whether or not a wireless communication is being made) to the image processing apparatuses 11b and 11c.

The image processing apparatuses 11b and 11c are apparatuses at least having the functions of the image processing apparatus 11a, and operate in the same manner as the image processing apparatus 11a. HMDs 10b and 10c are respectively wirelessly connected to these image processing apparatuses 11b and 11c. That is, the system shown in FIG. 1 includes two more sets (a set of the image processing apparatus 11b and HMD 10b, and a set of the image processing apparatus 11c and HMD 10c), which are the same as the set of the image processing apparatus 11a and HMD 10a.

The wires I/F 108a receives position and orientation information and connection information transmitted from the image processing apparatuses 11b and 11c, and outputs the received position and orientation information and connection information to the wireless I/F 105a. The wireless I/F 105a transmits the position and orientation information and connection information (the position and orientation information and connection information transmitted from the image processing apparatus 11b and those transmitted from the image processing apparatus 11c) received from the wired I/F 108a to the HMD 10a.

The CG image rendering unit 106a builds a virtual space based on data of the virtual space held by the contents DB 107a. The CG image rendering unit 106a generates, as virtual space images, images which are obtained by viewing that virtual space from the viewpoint having the position and orientation indicated by the position and orientation information received from the wireless I/F 105a. Note that the data of the virtual space held by the contents DB 107a include data associated with virtual objects which configure the virtual space, data associated with a light source laid out on the virtual space, and the like. Since the CG image rendering unit 106a outputs the generated virtual space images to the wireless I/F 105a, the wireless I/F 105a transmits the virtual space images to the HMD 10a.

That is, the image processing apparatus 11a (wireless I/F 105a) transmits the position and orientation information and connection information received from the image processing apparatuses 11b and 11c to the HMD 10a in addition to the virtual space images.

By the above arrangement, the composite images generated by the image processing apparatus 11a are presented in front of the eyes of the user who wears the HMD 10a on the head. The same applies to a user who wears the HMD 10b on the head, and a user who wears the HMD 10c on the head.

Since FIG. 1 illustrates only three sets of image processing apparatuses and HMDs, the system shown in FIG. 1 presents an MR space to three users. However, the numbers of image processing apparatuses and HMDs are not limited to them, and the numbers of image processing apparatuses and HMDs may be increased as long as realtimeness from image capturing to display can be maintained. However, assume that the upper limit of the number of HMDs is equal to or smaller than the number of image processing apparatuses. By increasing the number of image processing apparatuses, the number of compatible HMDs increases, thus broadening the MR space.

A case will be described below wherein during a wireless communication between the HMD and image processing apparatus, a failure occurs in the wireless communication depending on the standing position of a user who wears an HMD other than this HMD.

Figure 4:
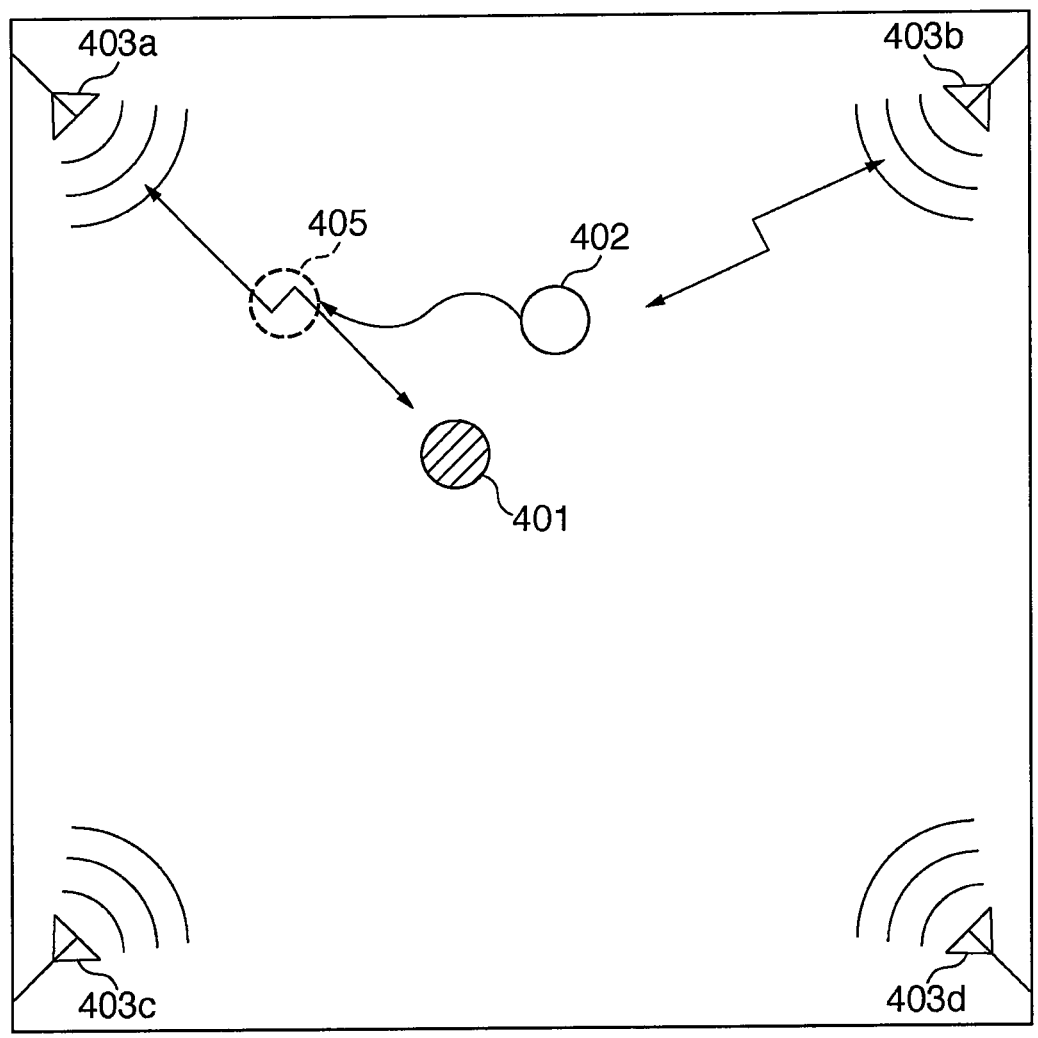
FIG. 4 is an overhead view showing a state in which two users who wear HMDs on their heads experience an MR space.

FIG. 4 is an overhead view showing a state in which two users who wear HMDs on their heads experience an MR space. Referring to FIG. 4, reference numerals 403a to 403d denote wireless I/Fs in image processing apparatuses; and 401 and 402, standing positions of users. In FIG. 4, an HMD (first HMD) mounted on the head of a user who stands at the position 401 (first user) is making a wireless communication with the wireless I/F 403a. Also, an HMD (second HMD) mounted on the head of a user who stands at the position 402 (second user) is making a wireless communication with the wireless I/F 403b.

In this state, assume that the second user moves to a position 405, that is, a direct view position between the first HMD and wireless I/F 403a. In this case, since the first HMD ceases to receive direct waves from the wireless I/F 403a, the received radio field strength impairs considerably, and transmission errors and frame omissions of virtual space images occur. As a result, on the first HMD, composite images composited with virtual space images including errors are displayed, and unnatural composite images in which virtual space images disappear suddenly are displayed.

The system according to this embodiment is configured to solve such problems.

Figure 5:
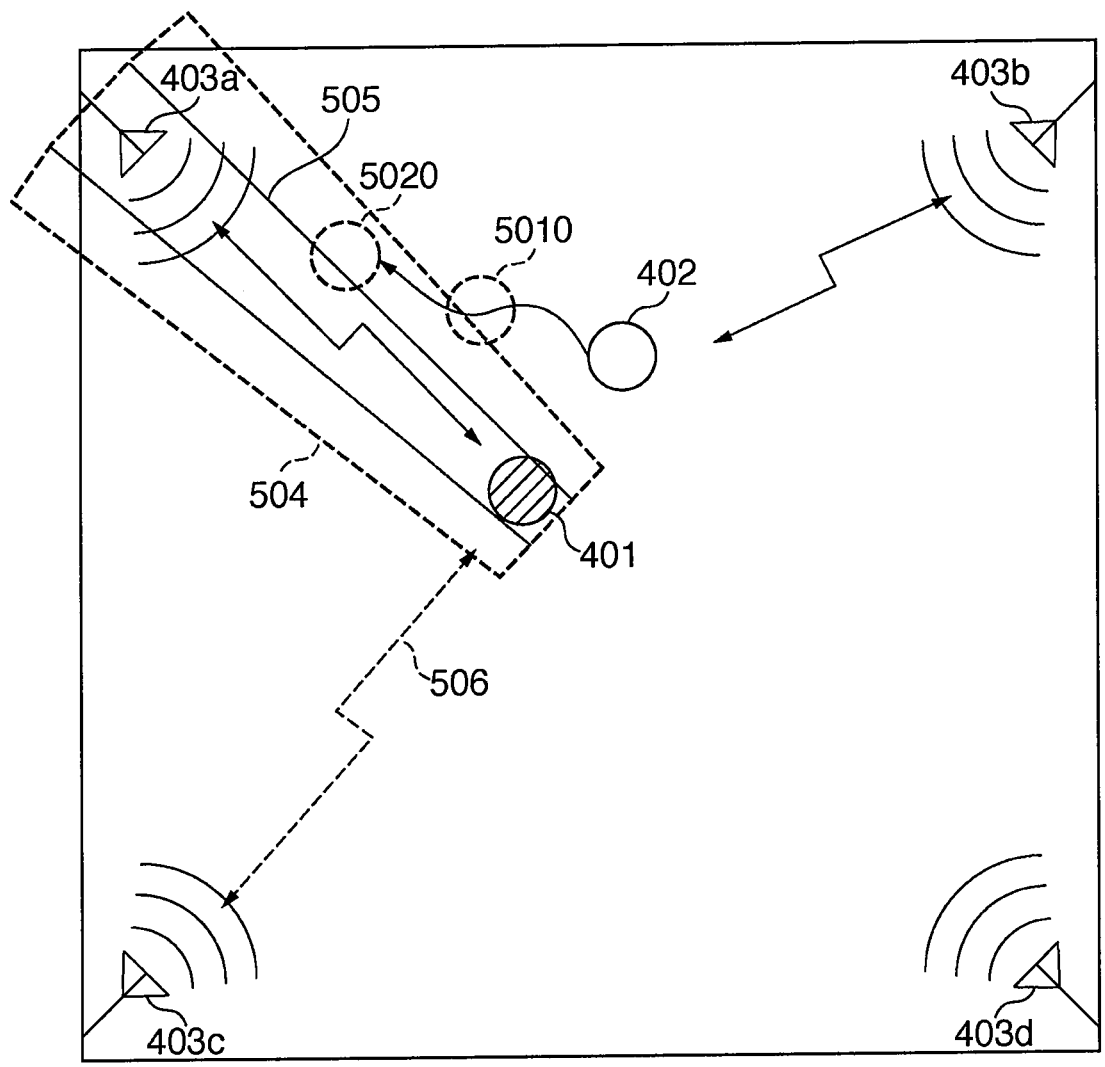
FIG. 5 is a view for explaining the operation to be executed by the system according to the first embodiment of the present invention so as to eliminate communication failures between the HMDs and image processing apparatuses.

FIG. 5 is a view for explaining the operation to be executed by the system according to this embodiment so as to eliminate communication failures between the HMD and image processing apparatus. The same reference numerals in FIG. 5 denote the same parts as in FIG. 4, and a repetitive description thereof will be avoided.

In this embodiment, a region which has, as an axis, a line that passes through the position of the first HMD and that of the wireless I/F 403a as a current communication partner of the first HMD is set. As such region, two regions 504 and 505 having different sizes are set, as shown in FIG. 5. In FIG. 5, the region 505 having the line as an axis (first region) and the region 504 including the region 505 (second region) are set. Since these regions 504 and 505 change every time the position, orientation, and the like of the first HMD have changed, they are re-set at predetermined time intervals. The shapes and sizes of these regions 504 and 505 may be appropriately determined.

Assume that the second user moves from the position 402 to a position 5010. In this case, the position 5010 falls outside the region 505 (outside the first region) and inside the region 504 (inside the second region). As described above, the first HMD acquires the position and orientation information of the second HMD from the image processing apparatus which communicates with the first HMD. Hence, when the first HMD detects that the position indicated by that position and orientation information falls outside the region 505 and inside the region 504, it operates as follows. That is, the first HMD specifies wireless I/Fs that currently do not make a wireless communication with any HMD from the wireless I/Fs 403b to 403d with reference to the connection information received from the image processing apparatus as a current communication partner of the first HMD. The first HMD then establishes a link to one of the specified wireless I/Fs. In this case, only the link is established. As a method of selecting one of wireless I/Fs that currently do not make a wireless communication with any HMD, for example, a method of selecting a wireless I/F which is set at a position closest to the first HMD is available. Such method can be feasible using the position information of each wireless I/F, which is measured in advance, and that of the first HMD. In FIG. 5, the first HMD establishes a link 506 to the wireless I/F 403c.

Assume that the second user further moves from the position 5010 to a position 5020. In this case, the position 5020 falls inside the region 505. As described above, the first HMD acquires the position and orientation information of the second HMD from the image processing apparatus which communicates with the first HMD. Hence, when the first HMD detects that the position indicated by that position and orientation information falls inside the region 505, it operates as follows. That is, the first HMD switches a channel to start a wireless communication with the wireless I/F (the wireless I/F 403c in FIG. 5) to which it has established the link, and disconnects the wireless communication with the wireless I/F (the wireless I/F 403a in FIG. 5) with which the wireless communication was made so far.

When the second user moves from the position 5010 to a position outside the region 504, the first HMD releases the link to the wireless I/F to which it has established the link.

Figure 7:
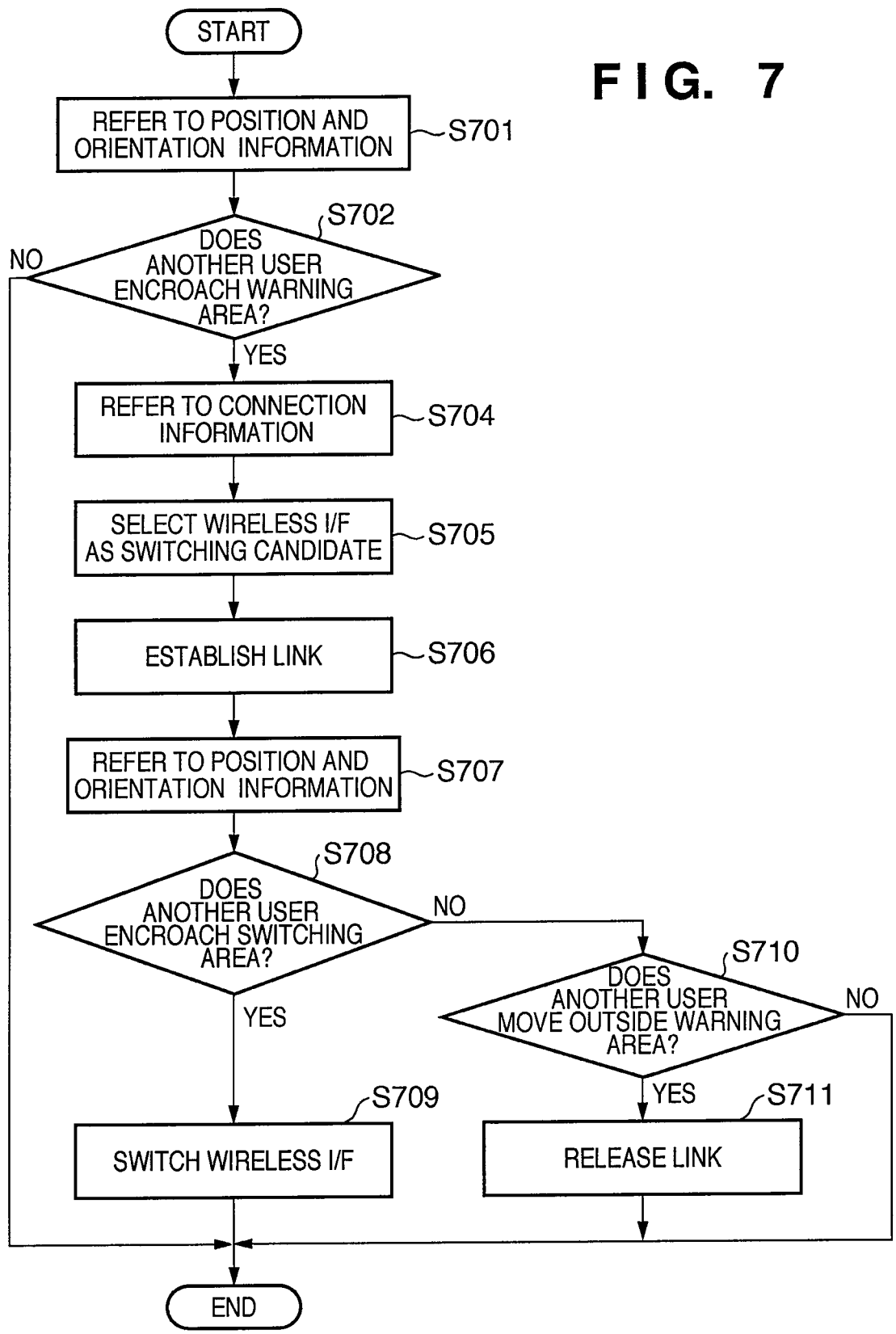
FIG. 7 is a flowchart of processing to be executed by a switching control unit 111.

FIG. 7 is a flowchart of processing to be executed by the switching control unit 111. The processing according to the flowchart of FIG. 7 is executed parallel to processing for displaying composite images of virtual space images and physical space images on the display unit 110.

The position and orientation information and connection information transmitted from the image processing apparatus 11a are input to the switching control unit 111 via the wireless I/F 103a. Furthermore, the position and orientation information calculated by the position and orientation information generation unit 102 is also input to the switching control unit 111.

Therefore, in step S701 the switching control unit 111 refers to position information in the position and orientation information received from the position and orientation information generation unit 102, and the "position information of the image processing apparatus 11a (wireless I/F 105a)" registered in a memory (not shown) in the HMD 10a. Then, the switching control unit 111 calculates and sets a region which has, as an axis, a line that passes through the position of the image capturing unit 101 and that of the image processing apparatus 11a (wireless I/F 105a). For example, the switching control unit 111 may calculate a columnar region in which that axis passes through the center positions of circular top and bottom surfaces.

Figure 6:
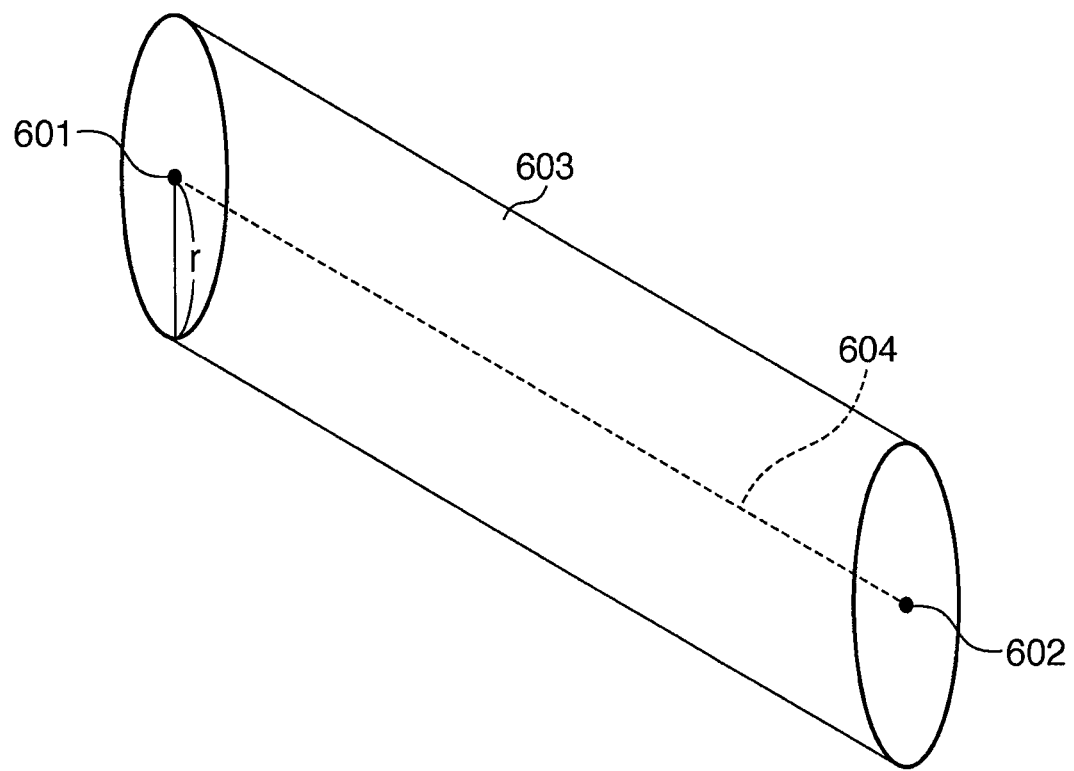
FIG. 6 is a view showing an example of a region to be set in step S701.

FIG. 6 shows an example of the region to be set in step S701. In FIG. 6, reference numeral 602 denotes a position indicated by the position information in the position and orientation information generated by the position and orientation information generation unit 102; and 601, a position of the image processing apparatus 11a (wireless I/F 105a), which is measured in advance. Reference numeral 604 denotes a line that passes through the positions 601 and 602. Reference numeral 603 denotes a region having that line 604 as an axis.

The region set in this step will be referred to as a "switching area". In step S701, the switching control unit 111 calculates and sets a region including the switching area as a "warning area". The shape and size of the warning area are not particularly limited. For example, the warning area may be calculated to have the same shape as the switching area but only a radius r of the bottom surface (top surface and bottom surface) shown in FIG. 6, which is larger than the switching area.

Note that setting the warning area and switching area corresponds to calculations of information (first region information and second region information) which indicate the shapes, positions, and orientations of the respective areas.

The switching control unit 111 determines with reference to the position and orientation information received via the wireless I/F 103a, that is, the position and orientation information of the HMD 10b and that of the HMD 10c if the position of the HMD 10b is located inside the warning area, and if that of the HMD 10c is located inside the warning area. That is, the switching control unit 111 executes inside/outside determination processing with respect to the warning area.

As a result of determination, if neither the positions of the HMDs 10b nor 10c are located inside the warning area, the switching control unit 111 ends this processing via step S702. On the other hand, as a result of determination, if at least one of the positions of the HMDs 10b and 10c is located inside the warning area, the process advances to step S704 via step S702.

In step S704, the switching control unit 111 refers to the connection information received via the wireless I/F 103a. As described above, since this connection information indicates whether or not the image processing apparatus 11b is now making a wireless communication and whether or not the image processing apparatus 11c is now making a wireless communication, the switching control unit 111 can specify an image processing apparatus which currently does not make a wireless communication with reference to the connection information.

In step S705, the switching control unit 111 specifies an image processing apparatus which currently does not make a wireless communication based on the connection information.

In step S706, the switching control unit 111 controls the wireless I/F 103a to establish a link to the wireless I/F of the image processing apparatus specified in step S705.

In step S707, the switching control unit 111 refers to the position and orientation information received via the wireless I/F 103a, that is, the position and orientation information of the HMD 10b and that of the HMD 10c. Then, the switching control unit 111 determines if the position of the HMD 11b is located inside the switching area, and if that of the HMD 10c is located inside the switching area.

As a result of determination, if the position of the HMD 10b or 10c is located inside the switching area, the process advances to step S709 via step S708.

In step S709, the switching control unit 111 controls the wireless I/F 103a to disconnect the communication with the wireless I/F as the previous wireless communication partner, that is, the wireless I/F 105a, and to start a communication with the wireless I/F to which the link is established in step S706.

On the other hand, if neither the positions of the HMDs 10b nor 10c are located inside the switching area, the process advances to step S710 via step S708.

The switching control unit 111 determines in step S710 if both the positions of the HMDs 10b and 10c are located outside the warning area. That is, after the process in step S702, there is a possibility that the positions of the HMDs 10b and 10c have changed, and these HMDs have moved to positions outside the warning area. In step S710, the switching control unit 111 executes such determination processing again in consideration of such possibility.

As a result of the determination processing, if both the positions fall outside the warning area, the process advances to step S711. In step S711, the switching control unit 111 releases the link established in step S706, and continues a wireless communication with the wireless I/F 105a as the wireless communication partner so far. On the other hand, if either of the positions of the HMDs 10b and 10c is still located inside the warning area, the switching control unit 111 ends this processing.

Note that the processing in the system having the three image processing apparatuses and three HMDs has been described. However, the numbers of the image processing apparatuses and HMDs are not limited to those, and the essence of the processing remains the same independently of the numbers of the image processing apparatuses and HMDs.

A case will be explained below wherein users as many as the number of image processing apparatuses experience an MR space.

Figure 8:
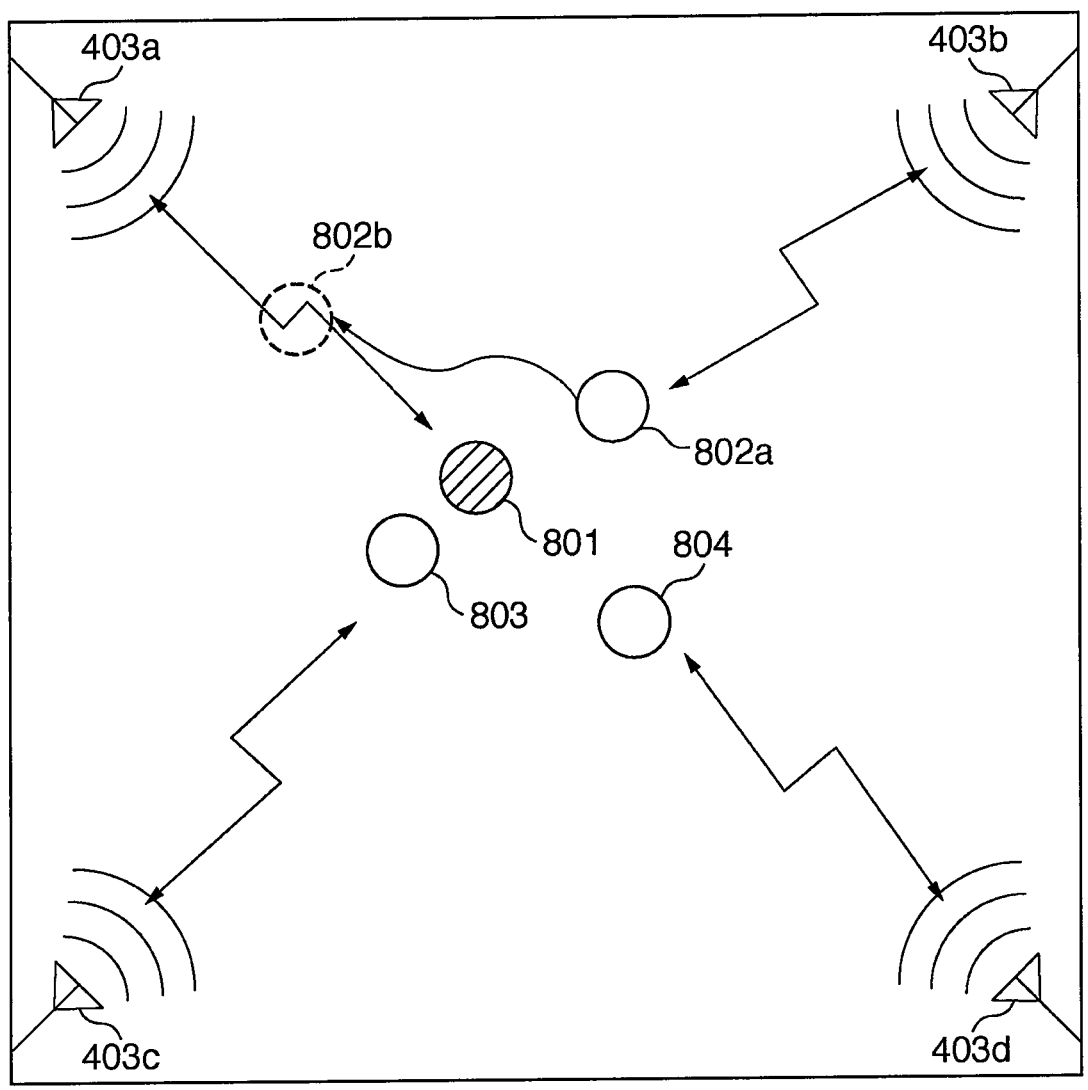
FIG. 8 is an overhead view showing a state in which four users who wear HMDs on their heads experience an MR space.
Figure 9:
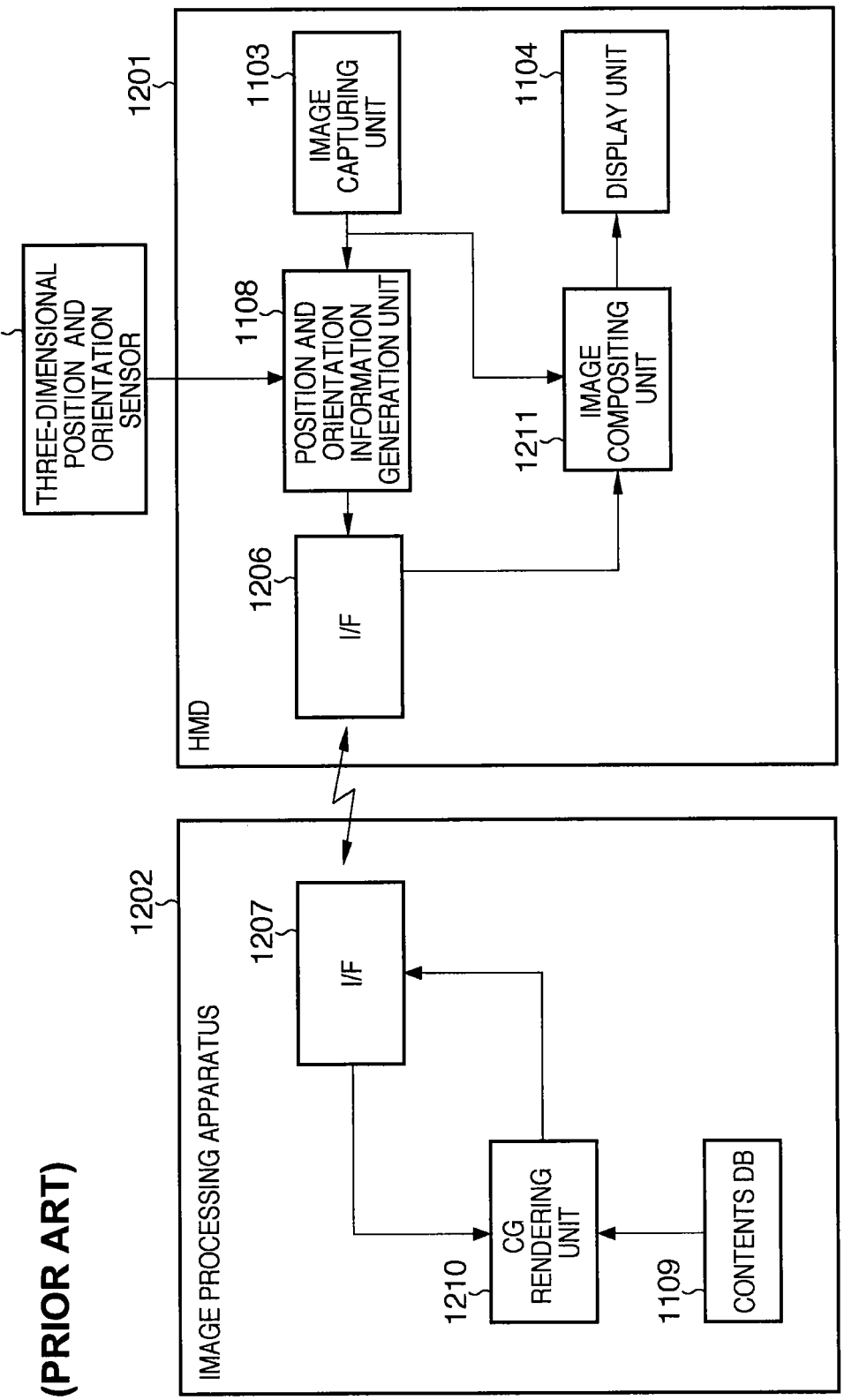
FIG. 9 is a block diagram showing the functional arrangement of a general wireless MR system.

FIG. 8 is an overhead view showing a state in which four users who wear HMDs on their heads experience an MR space. The same reference numerals in FIG. 8 denote the same parts in FIG. 4, and a repetitive description thereof will be avoided.

In FIG. 8, reference numerals 801, 802a, 803, and 804 respectively denote standing positions of the four users. Reference numeral 802b denotes a position after movement of the user at the position 802a. In FIG. 8, an HMD (first HMD) mounted on the head of the user located at the position 801 (first user) is making a wireless communication with the wireless I/F 403a. An HMD (second HMD) mounted on the head of the user located at the position 802a (second user) is making a wireless communication with the wireless I/F 403b. An HMD (third HMD) mounted on the head of the user located at the position 803 (third user) is making a wireless communication with the wireless I/F 403c. An HMD (fourth HMD) mounted on the head of the user located at the position 804 (fourth user) is making a wireless communication with the wireless I/F 403d.

In this state, assume that the second user moves from the position 802a to the position 802b. That is, assume that the first HMD ceases to receive direct waves from the wireless I/F 403a as a result of the movement of the second user to the position 802b. When the position of the second HMD is located inside the warning area generated by the first HMD, the first HMD specifies a wireless I/F which currently does not make a wireless communication with reference to connection information received from the image processing apparatuses that include the remaining wireless I/Fs 403b to 403d. However, in case of FIG. 8, all the wireless I/Fs 403b to 403d are making wireless communications, and there is no wireless I/F that does not make a wireless communication. In such case, the first HMD establishes a link to the wireless I/F 403b as a current communication partner of the second HMD. Also, the second HMD establishes a link to the wireless I/F 403a as a current communication partner of the first HMD. Of course, when the first HMD has established the link to the wireless I/F 403b, it sends a message that advises accordingly to the second HMD. Hence, upon detection of such message, the second HMD establishes the link to the wireless I/F 403a as a current communication partner of the first HMD.

When the position of the second HMD further moves to a position inside the switching area generated by the first HMD, the first HMD starts a wireless communication with the wireless I/F 403b, and sends a message that advises accordingly to the second HMD. Upon detection of that message, the second HMD starts a wireless communication with the wireless I/F 403a.

Note that the HMD used in the aforementioned system is a video see-through HMD but may be an optical see-through HMD.

In the description of this embodiment, the position of each image processing apparatus (that of each wireless I/F) is fixed. However, each image processing apparatus may move arbitrarily. In this case, a sensor for measuring the position of the image processing apparatus (wireless I/F) may be attached to that image processing apparatus (wireless I/F), and the measurement result (position information) of the sensor is sequentially output to the HMD. Of course, the arrangement for obtaining the position information of the image processing apparatus (wireless I/F) is not limited to this, and any other methods may be used.

The arrangement described as the system according to this embodiment is merely an example of the arrangement, and an essential arrangement is as follows. That is, the essential arrangement is a system which has a plurality of head-mounted displays, a plurality of communication devices which make wireless communications with the head-mounted displays, and a plurality of image processing apparatuses which transmit images to the head-mounted displays via the communication devices, and allows the image processing apparatuses to communicate with each other.

Each image processing apparatus in the system with that arrangement is characterized by comprising the following arrangement. That is, the image processing apparatus transmits position information of the head-mounted display as a current wireless communication partner of the communication device which is in use by the self image processing apparatus to another image processing apparatus other than the self image processing apparatus. Furthermore, the image processing apparatus receives position information of another head-mounted display as a current wireless communication partner of the communication device which is in use by the other image processing apparatus.

The image processing apparatus transmits the received position information of the other head-mounted display to the head-mounted display as the current wireless communication partner of the communication device which is in use by the self image processing apparatus.

Each head-mounted display of the system with the above arrangement is characterized by comprising the following arrangement. That is, the head-mounted display generates region information indicating a region having, as an axis, a line which passes through the position of the self head-mounted display and that of a communication device of interest as a current communication partner of the self head-mounted display. The head-mounted display acquires the position information transmitted from another head-mounted display. The head-mounted display determines if a position indicated by this acquired position information is included within the region indicated by the generated region information. The head-mounted display selects one of the communication device of interest and the communication device other than the communication device of interest as a wireless communication partner according to the determination result, and receives images via a wireless communication with the selected communication device (reception control).

Note that the communication device of interest is included in its own image processing apparatus.

Furthermore, the HMD described in this embodiment is explained as an example of the head-mounted display, as described above, and its essential arrangement is as follows.

The head-mounted display operates in the aforementioned system, and has the following arrangement. That is, the head-mounted display generates region information indicating a region having, as an axis, a line which passes through the position of the self head-mounted display and that of a communication device of interest as a current communication partner of the self head-mounted display. The head-mounted display acquires position information of another head-mounted display other than the self head-mounted display. The head-mounted display determines whether or not the position indicated by this acquired position information is included in the region indicated by the generated region information. The head-mounted display selects one of the communication device of interest and the communication device other than the communication device of interest as a wireless communication partner according to the determination result, and receives images via a wireless communication with the selected communication device.

[Second Embodiment]

In the first embodiment, the HMD executes determination processing of a wireless I/F with which it makes a wireless communication. However, a server apparatus may be arranged on a network to which respective image processing apparatuses are connected, may execute that determination processing, and may transmit the determination result to HMDs via the image processing apparatuses. In this case, each HMD selects a wireless communication partner with reference to the determination result. That is, in this embodiment, the server apparatus as an external apparatus executes some of the processes executed by the HMD in the first embodiment.

Figure 10:
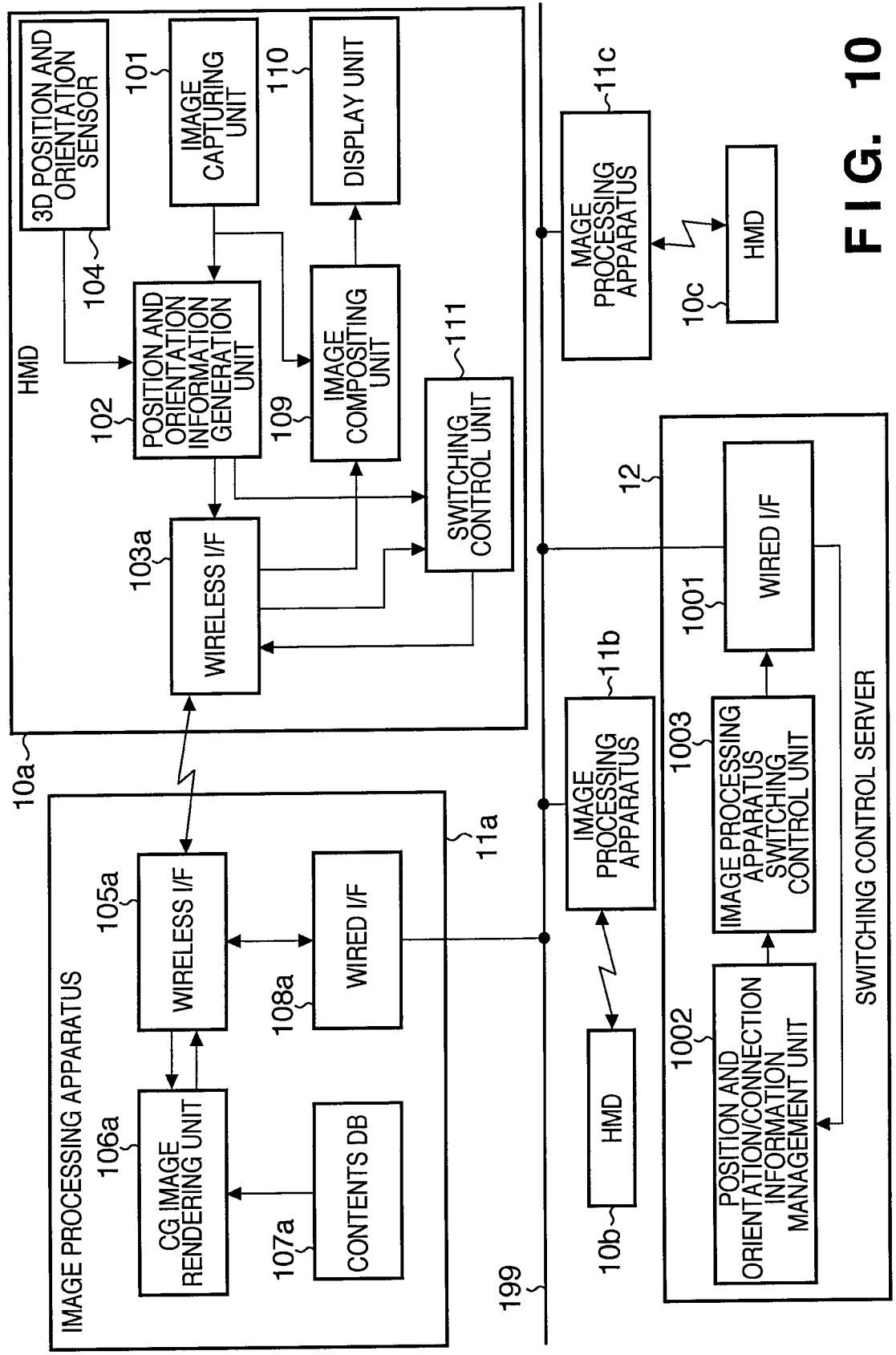
FIG. 10 is a block diagram showing the functional arrangement of a system according to the second embodiment of the present invention.
Figure 11:
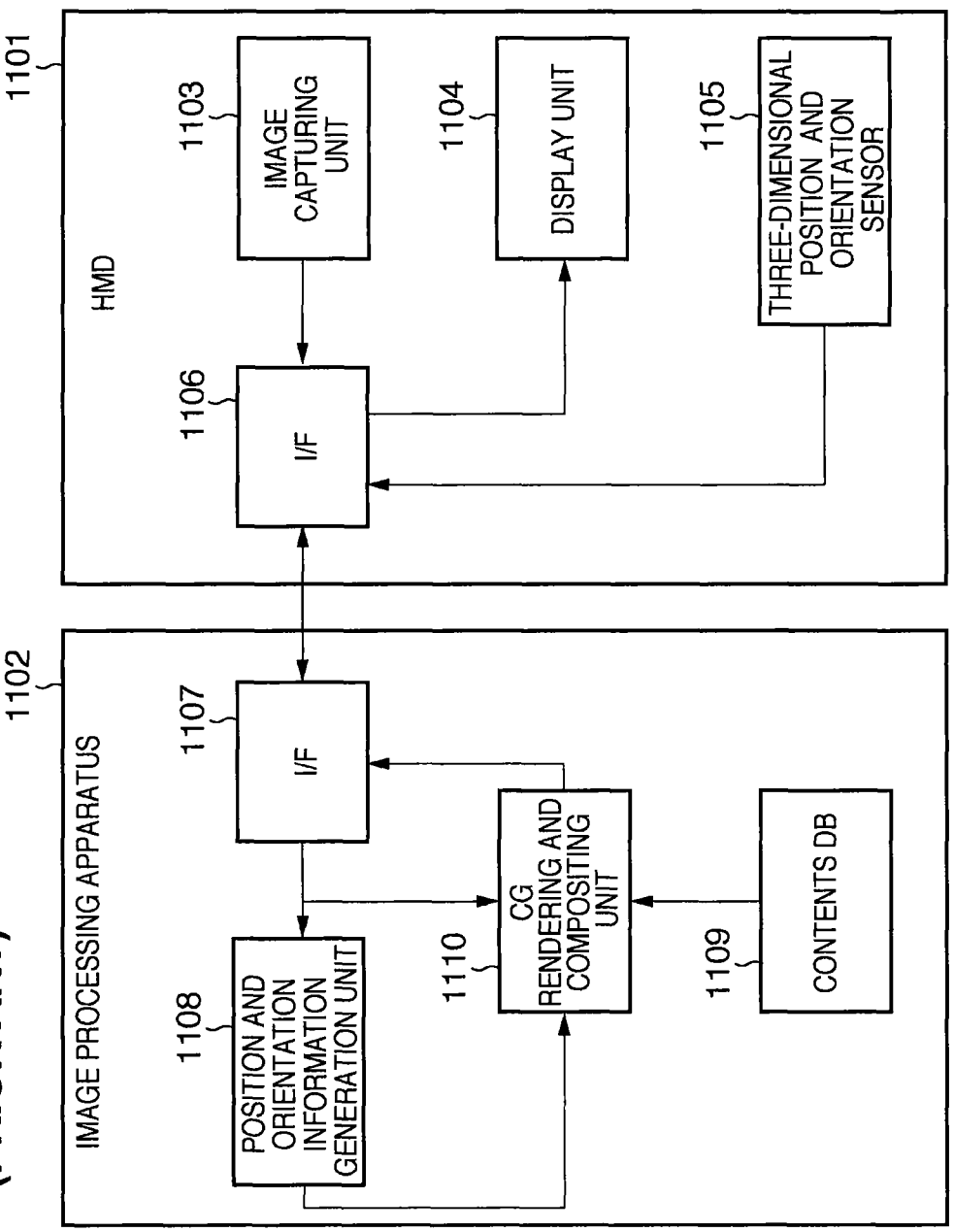
FIG. 11 is a block diagram showing the functional arrangement of a general MR system using a video see-through HMD.

FIG. 10 is a block diagram showing the functional arrangement of a system according to this embodiment. The same reference numerals in FIG. 10 denote the same parts as in FIG. 1, and a repetitive description thereof will be avoided. That is, a description of the same operations as in the first embodiment will not be given, and only different operations will be explained below.

Respective image processing apparatuses 11a to 11c transmit connection information, and position and orientation information received from HMDs 10a to 10c as their wireless communication partners to a switching control server 12 connected on a network 199.

A position and orientation/connection information management unit 1002 of the switching control server 12 executes the processing according to the flowchart of FIG. 7, which has been described as that to be executed by the switching control unit 111. However, the position and orientation/connection information management unit 1002 does not actually execute establishment of links and switching control of wireless communication partners. That is, the position and orientation/connection information management unit 1002 generates "switching information" indicating the result of the processing according to the flowchart of FIG. 7, so as to control each switching control unit 111 to execute the result of the processing according to the flowchart of FIG. 7. The position and orientation/connection information management unit 1002 executes such generation processing for each of the image processing apparatuses 11a to 11c.

The position and orientation/connection information management unit 1002 returns switching information generated for the image processing apparatus 11a to the image processing apparatus 11a, and that generated for the image processing apparatus 11b to the image processing apparatus 11b. Also, the position and orientation/connection information management unit 1002 returns switching information generated for the image processing apparatus 11c to the image processing apparatus 11c.

The image processing apparatuses 11a to 11c transmit the switching information received from the switching control server 12 to the HMDs 10a to 10c as their wireless communication partners.

In case of the HMD 10a, the switching control unit 111 selects a wireless communication partner and establishes a link with reference to the switching information received from the image processing apparatus 11a. That is, the switching control unit 111 executes the contents determined as processing to be executed by the switching control unit 111 as a result of the processing according to the flowchart of FIG. 7 for the image processing apparatus 11a by the position and orientation/connection information management unit 1002.

In this embodiment as well, an optical see-through HMD may be used in place of a video see-through HMD.

In this embodiment, the switching control server 12 has been explained as an independent apparatus. However, hardware having the functions of the switching control server 12 may be incorporated in one of the image processing apparatuses 11a to 11c. In this case, the image processing apparatuses (except for the image processing apparatus that incorporates the hardware) transmit position and orientation information and connection information to the image processing apparatus that incorporates the hardware.

As described above, according to this embodiment, since the processes to be executed by each HMD are reduced compared to the first embodiment, the consumption power of the HMD can be reduced.

[Other Embodiments]

The objects of the present invention are also achieved as follows. That is, a recording medium (or storage medium), which records a program code of software (computer program) that can implement the functions of the aforementioned embodiments, is supplied to a system or apparatus. The recording medium is of course a computer-readable recording medium. A computer (or a CPU or MPU) of the system or apparatus reads out and executes the program code stored in the recording medium. In this case, the program code itself read out from the recording medium implements the functions of the aforementioned embodiments, and the recording medium which stores the program code constitutes the present invention.

When the computer executes the readout program code, an operating system (OS) or the like, which runs on the computer, executes some or all actual processes based on an instruction of the program code. The present invention includes a case wherein the functions of the aforementioned embodiments are implemented by these processes.

Furthermore, assume that the program code read out from the recording medium is written in a memory equipped on a function expansion card or a function expansion unit, which is inserted into or connected to the computer. The present invention also includes a case wherein the functions of the aforementioned embodiments may be implemented when a CPU or the like arranged in the expansion card or unit then executes some or all of actual processes based on an instruction of the program code.

When the present invention is applied to the recording medium, that recording medium stores a program code corresponding to the aforementioned flowchart.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-202230 filed Aug. 2, 2007, which is hereby incorporated by reference herein in its entirety.

What is claimed is:

1. A system comprising:
a plurality of head-mounted displays;
a plurality of communication devices which communicate wirelessly with the plurality of head-mounted displays;
a plurality of image processing apparatuses which transmit images to the plurality of head-mounted displays via the plurality of communication devices, one image processing apparatus which is each one of the plurality of image processing apparatuses being configured to:
transmit position information of one head-mounted display which is one of the plurality of head-mounted displays as a current communication partner of one communication device which is one of the plurality of communication devices and is in use by the one image processing apparatus and receive position information, which is transmitted from another image processing apparatus which is different from the one image processing apparatus and is another one of the plurality of image processing apparatuses, of another head-mounted display which is different from the one head-mounted display and is another one of the plurality of head-mounted displays as a current wireless communication partner of another communication device which is different from the one communication device and is another one of the plurality of communication devices and is in use by the another image processing apparatus, and
transmit the position information of the another head-mounted display to the one head-mounted display as the current communication partner of the one communication device which is in use by the one image processing apparatus, and
wherein the one head-mounted display comprises:
a generation processor configured to generate space information indicating a first space having, as an axis, a line which passes through position of the one head-mounted display and a position of the one communication device as a current wireless communication partner of the one head-mounted display,
an acquisition interface configured to acquire the position information of the another head-mounted display transmitted from the one image processing apparatus which uses the one communication device,
a determination processor configured to determine whether or not a position of the another head-mounted display indicated by the position information acquired by the acquisition interface included in the first space indicated by the space information generated by the generation processor; and
a reception control processor configured to select one of the one communication device and the another communication device as the current wireless communication partner of the one head-mounted display according to a determination result of said determination processor and receive an image which is one of the images via a wireless communication with the selected communication device,
wherein the reception control processor is configured to select the another communication device in response to the determination processor determining that the position of the another head-mounted display is included in the first space indicated by the space information and to receive the image which is one of the images wirelessly from the another communication device.

2. The system according to claim 1, wherein the reception control processor is further configured to establish a wireless communication link with the another communication device in response to determining that the position of the another head-mounted display falls outside the first space and inside a second space which includes the first space.

3. The system according to claim 2, wherein the reception control processor is further configured to release the established wireless communication link in response to determining that the position of the another head-mounted display falls outside the second space.

4. The system according to claim 2, wherein the reception control processor is further configured to receive the image which is one of the images via the established wireless communication link in response to determining that the position of the another head-mounted display falls inside the first space.

5. The system according to claim 1, wherein:
the plurality of image processing apparatuses includes a first image processing apparatus and a second image processing apparatus, the plurality of head-mounted displays includes a first head-mounted display and a second head-mounted display, and the plurality of communication devices include a first communication device and a second communication device; and
the first image processing apparatus transmits the image, which is one of the images, including a virtual object to the first head-mounted display via one of the first communication device and the second communication device.

6. cording o claim 1, wherein:
the plurality of image processing apparatuses includes a first image processing apparatus and a second image processing apparatus, the plurality of head-mounted displays includes a first head-mounted display a second head-mounted display, and the plurality of communication devices include a first communication device and a second communication device; and
the second communication device is not connected with head-mounted displays which are the plurality of head-mounted displays except for the first head-mounted display and the second head-mounted display.

7. The system according to claim 1, wherein:
the plurality of image processing apparatuses includes a first image processing apparatus and a second image processing apparatus, the plurality of head-mounted displays includes a first head-mounted display and a second head-mounted display, and the plurality of communication devices include a first communication device and a second communication device; and the second communication device is nearer to the first head-mounted display than to the second head-mounted display.

\* \* \* \* \*